US012643801B2

(12) United States Patent
Kim et al.

(10) Patent No.: US 12,643,801 B2
(45) **Date of Patent: *Jun. 2, 2026**

(54) ELECTRODE ACTIVE MATERIAL AND PROCESS FOR MANUFACTURING SAID ELECTRODE ACTIVE MATERIAL

(71) Applicant: BASF SE, Ludwigshafen am Rhein (DE)

(72) Inventors: Young Jin Kim, Beachwood, OH (US); James A. Sioss, Beachwood, OH (US); Jacob Haag, Beachwood, OH (US); Plousia Vassilaras, Beachwood, OH (US); Jordan K. Lampert, Cleveland, OH (US); Brandon Ray Long, Macedonia, OH (US)

(73) Assignee: BASF SE, Ludwigshafen am Rhein (DE)

( * ) Notice: Subject to any disclaimer, the term of this patent is extended or adjusted under 35 U.S.C. 154(b) by 922 days.

This patent is subject to a terminal disclaimer.

(21) Appl. No.: 17/754,952

(22) PCT Filed: Oct. 15, 2020

(86) PCT No.: PCT/EP2020/079071

§ 371 (c)(1),
(2) Date: Apr. 18, 2022

(87) PCT Pub. No.: WO2021/078627

PCT Pub. Date: Apr. 29, 2021

(65) Prior Publication Data

US 2022/0411281 A1 Dec. 29, 2022

(30) Foreign Application Priority Data

Oct. 22, 2019 (EP) .................................... 19204615

(51) Int. Cl.

| | |
|---|---|
| ***C01G 53/00*** | (2025.01) |
| ***C01G 53/50*** | (2025.01) |
| ***C01G 53/82*** | (2025.01) |
| ***H01M 4/131*** | (2010.01) |
| ***H01M 4/1391*** | (2010.01) |
| ***H01M 4/36*** | (2006.01) |
| ***H01M 4/485*** | (2010.01) |
| ***H01M 4/505*** | (2010.01) |
| ***H01M 4/525*** | (2010.01) |
| ***H01M 4/62*** | (2006.01) |
| ***H01M 10/0525*** | (2010.01) |
| *H01M 4/02* | (2006.01) |

(52) U.S. Cl.

CPC ............ *C01G 53/50* (2013.01); *C01G 53/82* (2025.01); *H01M 4/131* (2013.01); *H01M 4/1391* (2013.01); *H01M 4/366* (2013.01); *H01M 4/485* (2013.01); *H01M 4/505* (2013.01); *H01M 4/525* (2013.01); *H01M 4/62* (2013.01); *H01M 4/628* (2013.01); *H01M 10/0525* (2013.01); *C01P 2004/40* (2013.01); *C01P 2004/61* (2013.01); *C01P 2004/64* (2013.01); *C01P 2004/84* (2013.01); *C01P 2006/40* (2013.01); *H01M 2004/021* (2013.01); *H01M 2004/028* (2013.01)

(58) Field of Classification Search

None
See application file for complete search history.

(56) References Cited

U.S. PATENT DOCUMENTS

| | | | | |
|---|---|---|---|---|
| 6,921,609 | B2 | 7/2005 | Lampe-Onnerud et al. | |
| 8,993,051 | B2 | 3/2015 | Kelder et al. | |
| 2014/0205898 | A1* | 7/2014 | Lee .................... | H01M 4/1391 427/126.6 |
| 2015/0171423 | A1 | 6/2015 | Kim et al. | |
| 2015/0372300 | A1 | 12/2015 | Imaizumi et al. | |
| 2017/0077497 | A1* | 3/2017 | Ogata .................. | H01M 4/587 |
| 2017/0301909 | A1 | 10/2017 | Lee et al. | |
| 2018/0009665 | A1* | 1/2018 | Kawaguchi ......... | H01M 4/1393 |
| 2018/0212237 | A1* | 7/2018 | Lee ...................... | H01M 4/366 |
| 2022/0263069 | A1 | 8/2022 | Kim et al. | |
| 2024/0038987 | A1* | 2/2024 | Kim ..................... | H01M 4/525 |

FOREIGN PATENT DOCUMENTS

| | | | |
|---|---|---|---|
| JP | 4789066 | B2 | 10/2011 |
| JP | 5139024 | B2 | 2/2013 |
| WO | WO-2021/067626 | A2 | 4/2021 |

OTHER PUBLICATIONS

Pavoni et al, LiCoO2 particle size distribution as a functionof the state of health of discarded cell phonebatteries, Feb. 15, 2018, Powder Technology, vol. 326 (Year: 2018).*

(Continued)

*Primary Examiner* — Mary Grace Byram
(74) *Attorney, Agent, or Firm* — Armstrong Teasdale LLP

(57) ABSTRACT

Electrode active material comprising (A) a core material according to general formula $Li_{1+x1}TM_{1-x1}O_2$ wherein TM is a combination of Ni and at least one of Mn, Co and Al, and, optionally, at least one more metal selected from Mg, Ti, Zr, Nb, Ta, and W, and x1 is in the range of from −0.05 to 0.2, and (B) particles of cobalt compound(s) and of aluminum compound(s) and of titanium compound(s) or zirconium compound(s) wherein the molar ratio of lithium to cobalt in said particles is in the range of from zero to below 1 and wherein said particles are attached to the surface of the core material.

12 Claims, No Drawings

(56) References Cited

OTHER PUBLICATIONS

Arico et al, Nanostructured materials for advanced energy conversion and storage devices, May 2005, Nature Materials, vol. 4 (Year: 2005).*
International Search Report dated Jan. 25, 2021, International Application No. PCT/EP2020/079071.
Huang Yaqun et al, "Enhanced electrochemical performance of LiNi0.8Co0.0502 by nanoscale . . . ," Electrochimica Acta, Elsevier, Amsterdam, NL, vol. 231, pp. 294-299, Feb. 17, 2014.
Kwang Soo Yoo et al., "Surface Modification of Li(Ni0.6Co).2Mn0.2)02 Cathode Materials by Nano-A10203 to Improve Electrochemical . . . ," Materials, vol. 10, No. 11, Nov. 1, 2017.
European Search Report for EP Patent Application No. 19204615.9, Issued on Apr. 28, 2020, 3 pages.

* cited by examiner

ELECTRODE ACTIVE MATERIAL AND PROCESS FOR MANUFACTURING SAID ELECTRODE ACTIVE MATERIAL

This application is a national stage filing under 35 U.S.C. § 371 of International Application No. PCT/EP2020/079071, filed on Oct. 15, 2020, which claims the benefit of priority to European Application No. 19204615.9, filed on Oct. 22, 2019; the disclosure of each of these applications are each incorporated herein by reference in its entirety.

The present invention is directed towards an electrode active material comprising (A) a core material according to general formula $Li_{1+x1}TM_{1-x1}O_2$ wherein TM is a combination of Ni and at least one of Mn, Co and Al, and, optionally, at least one more metal selected from Mg, Ti, Zr, Nb, Ta, and W, and x1 is in the range of from −0.05 to 0.2, and (B) particles of cobalt compound(s) and of aluminum compound(s) and of titanium compound(s) or zirconium compound(s) wherein the molar ratio of lithium to cobalt in said particles is in the range of from zero to below 1 and wherein said particles are attached to the surface of the core material.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Currently, a certain interest in so-called Ni-rich electrode active materials may be observed, for example electrode active materials that contain 60 mole-% or more of Ni, referring to the total TM content.

One problem of lithium ion batteries—especially of Ni-rich electrode active materials—is attributed to undesired reactions on the surface of the electrode active materials. Such reactions may be a decomposition of the electrolyte or the solvent or both, and it may lead to gassing in the electrochemical cell. It has thus been tried to protect the surface without hindering the lithium exchange during charging and discharging. Examples are attempts to coat the electrode active materials with, e.g., aluminium oxide or calcium oxide, see, e.g., U.S. Pat. No. 8,993,051.

Other theories assign undesired reactions to free LiOH or $Li_2CO_3$ on the surface, or to so-called reactive lithium that can be determined by extraction with an aqueous medium. Attempts have been made to remove such free LiOH or $Li_2CO_3$ or reactive lithium by washing the electrode active material with water, see, e.g., JP 4,789,066 B, JP 5,139,024 B, and US2015/0372300.

However, in some instances it was observed that the properties of the resultant electrode active materials did not improve or even deteriorated.

In U.S. Pat. No. 6,921,609, certain cathode active materials are treated with an aqueous solution of $LiNO_3$ and $Co(NO_3)_2$ hexahydrate, followed by calcination. The authors claim that a gradient of $LiCoO_2$ is formed. However, problems resulting from residual or extractable lithium are not solved.

Sometimes, slurries of electrode active materials and conductive carbon and binder tend to gelling. Said gelling makes the application of said slurry to current collectors difficult and should be avoided.

It was an objective of the present invention to provide a process for making Ni-containing and, in particular, Ni-rich electrode active materials with excellent electrochemical properties and with a low tendency of gelling. It was also an objective to provide Ni-rich electrode active materials with excellent electrochemical properties.

Accordingly, the electrode active material defined at the outset has been found, hereinafter also referred to as inventive electrode active material. Inventive electrode active material comprises (A) a core material according to general formula $Li_{1+x1}TM_{1-x1}O_2$, hereinafter also referred to as "core (A)", wherein TM is a combination of Ni and at least one of Mn, Co and Al, and, optionally, at least one more metal selected from Mg, Ti, Zr, Nb, Ta, and W, and x1 is in the range of from −0.05 to 0.2, and (B) particles of cobalt compound(s) and of aluminum compound(s) and of titanium compound(s) or zirconium compound(s), hereinafter also referred to as "particles (B)", wherein the molar ratio of lithium to cobalt in said particles is in the range of from zero to below 1 and wherein said particles are attached to the surface of the core material.

Core (A) and particles (B) will be described in more details below.

In one embodiment of the present invention core (A) has an average particle diameter (D50) in the range of from 3 to 20 μm, preferably from 5 to 16 μm. The average particle diameter may be determined, e. g., by light scattering or LASER diffraction or electroacoustic spectroscopy. The particles are usually composed of agglomerates from primary particles, and the above particle diameter refers to the secondary particle diameter.

Some elements are ubiquitous. In the context of the present invention, traces of ubiquitous metals such as sodium, calcium, iron or zinc, as impurities will not be taken into account in the description of the present invention. Traces in this context will mean amounts of 0.05 mol-% or less, referring to the total metal content of the TM or of particles (B), respectively.

Core (A) is preferably a nickel-rich electrode active material. Although the percentage of nickel in the core may be 50 mole-% or even lower, e.g., 40 mole-%, it is preferred that the molar percentage of nickel in the core material is at least 60 mole-%, referring to all metals in TM.

TM in the above formula contains at least one of Mn, Co and Al, preferably at least two, e.g., Co and Mn, Co and Al, or even Mn, Co, and Al.

Optionally, TM may contain at least one more metal selected from Mg, Ti, Nb, Ta, and W.

In one embodiment of the present invention, TM is a combination of metals according to general formula (I)

$$(Ni_aCo_bMn_c)_{1-d}M_d \quad (I)$$

with a being in the range of from 0.6 to 0.95, preferably from 0.75 to 0.95, more preferably from 0.80 to 0.91, b being in the range of from 0.025 to 0.2, preferably from 0.025 to 0.1, c being in the range of from 0.025 to 0.2, preferably from 0.025 to 0.1, and more preferably from 0.04 to 0.1, d being in the range of from zero to 0.1, M is selected from Al, Mg, Ti, Zr, Nb, Ta and W, and combinations of at least two of the foregoing, preferably Al and Al and at least one of the foregoing, and a+b+c=1.

In another embodiment of the present invention, the variable TM corresponds to general formula (Ia)

$(Ni_a—Co_bAl_c)_{1-d}*M_d$(I a)

with a*+b*+e*=1 and a* being in the range of from 0.75 to 0.95, preferably from 0.88 to 0.95, b* being in the range of from 0.025 to 0.2, preferably from 0.025 to 0.1, e* being in the range of from 0.01 to 0.2, preferably from 0.015 to 0.04, d* being in the range of from zero to 0.1, preferably from zero to 0.02, $M^2$ is at least one of W, Mo, Ti or Zr.

In one embodiment of the present invention TM corresponds to general formula (I) and x1 is in the range from −0.05 to 0.2, preferably from zero to 0.1 and even more preferably 0.01 to 0.05.

In one embodiment of the present invention TM corresponds to general formula (I a) and x1 is in the range of from −0.05 to zero.

Particles (B) comprise of cobalt oxide compounds in which the average oxidation state of cobalt is higher than +II and lower than +III or higher than +II and lower than +IV and wherein the molar ratio of lithium to cobalt in said particles is in the range of from zero to below 1 and wherein said particles are attached to the surface of the core material, thus, to core (A). The oxidation state of cobalt in particles (B) may be determined by X-ray photoelectron spectroscopy ("XPS"), and the property of being attached to core (A) may be determined by imaging processes such as transmission electron microscopy ("TEM") and scanning electron microscopy ("SEM"). The phase type of particles (B) may be determined by high resolution X-ray powder diffraction ("XRD"). In a preferred embodiment, the average molar ratio of lithium to cobalt in particles (B) is in the range of from zero to below 1.

Particles (B) may be incorporated into pores of core (A), fully or partially, or attached to the outer surface.

In one embodiment of the present invention, the average oxidation state of cobalt in particles (B) is in the range of +II to +III, preferably from 2.5 to 3.0, even more preferably 3.

In one embodiment of the present invention, the average oxidation state of cobalt in particles (B) is in the range of +III to +IV, preferably from 3.0 to 3.5, even more preferably 3.5.

The molar ratio of lithium to cobalt in particles (B) is in the range of from zero to 1, preferably from above zero to below 1.

In a preferred embodiment, particles (B) are not composed of a defined compound but a mixture of several cobalt containing oxides, for example, substoichiometric lithium cobalt oxide compounds, furthermore $Co_3O_4$ or $LiCo_2O_4$, with $LiCoO_2$ and $CO_2O_3$ as optional components.

In one embodiment of the present invention, the weight ratio of core (A) and particles (B) is in the range of from 1000:1 to 10 to 1, preferably 100:1 to 20:1.

In one embodiment of the present invention, particles (B) have an average diameter (D50) in the range of from 10 nm to 10 μm, preferably 10 nm to 1 μm. The average diameter (D50) may be determined by imaging processes such as TEM and SEM.

Particles (B) comprise cobalt and lithium and Al and at least one of Ti and Zr as additional elements, and it is preferred that particles (B) comprise more Co than any of Al, Ti and Zr. In embodiments wherein particles (B) comprise Al and at least one additional element selected from Ti and Zr individual particles (B) may comprise both Li and Co and at least one of Ti, Zr and Al, but in other embodiments, individual particles comprise either cobalt or any of Ti, Zr or Al.

In one embodiment of the present invention, in particles (B) the molar ratio of Co to the sum of Al and Zr or Ti is in the range of from 2:1 to 50:1.

In one embodiment of the present invention inventive electrode active materials have a surface (BET) in the range of from 0.1 to 0.8 $m^2/g$, determined according to DIN-ISO 9277:2003-05.

A further aspect of the present invention refers to electrodes comprising at least one electrode material active according to the present invention. They are particularly useful for lithium ion batteries. Lithium ion batteries comprising at least one electrode according to the present invention exhibit a good discharge behavior. Electrodes comprising at least one electrode active material according to the present invention are hereinafter also referred to as inventive cathodes or cathodes according to the present invention.

Cathodes according to the present invention can comprise further components. They can comprise a current collector, such as, but not limited to, an aluminum foil. They can further comprise conductive carbon and a binder.

Suitable binders are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binder is selected from those (co)polymers which have an average molecular weight M, in the range from 50,000 to 1,000,000 g/mol, preferably to 500,000 g/mol.

Binder may be cross-linked or non-cross-linked (co) polymers.

In a particularly preferred embodiment of the present invention, binder is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to electrode active material. In other embodiments, inventive cathodes may comprise 0.1 up to less than 1% by weight of binder(s).

A further aspect of the present invention is a battery, containing at least one cathode comprising inventive electrode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (II) and (III)

(II)

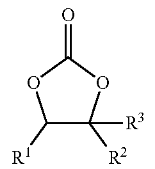

(III)

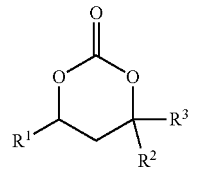

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tertbutyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

(IV)

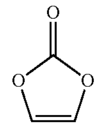

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$. $LiC(C_nF_{2n+1}SO_2)_3$, lithium imides such as $LiN(C_nF_{2n+n}SO_2)_2$. where n is an integer in the range from 1 to 20, $LiN(SO_2F)_2$, $Li_2SiF_6$, $LiSbF_6$, $LiAlCl_4$ and salts of the general formula $(CnF_{2n+1}SO_2)_tYLi$, where m is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to −10° C. or even less), a very good discharge and cycling behavior.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further relates to the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention further relates to a process for manufacturing inventive electrode active materials, hereinafter also referred to as "inventive process" or "process according to the (present) invention".

The inventive process comprises at least three steps, (a), (b), and (d), and it may comprise optional step (c), in the context of the present invention also referred to as step (a) and step (b) and step (d) and step (c), respectively. Steps (a) and (b) and, if applicable, (c), and (d) are performed subsequently.

The inventive process comprising the steps of (a) providing a material according to general formula $Li_{1+x2}TM_{1-x2}O_2$ wherein TM is a combination of Ni and at least one of Mn, Co and Al, and, optionally, at least one more metal selected from Mg, Ti, Zr, Nb, Ta, and W, and x2 is in the range of from zero to 0.25, (b) contacting said material with an oxide or (oxy)hydroxide or nitrate of cobalt and, up to 10% by vol of water and, optionally, at least one oxide or (oxy) hydroxide or nitrate of Ti, Zr or Al, (c) removing water from the mixture obtained in step (b), (d) calcining the intermediate of step (c).

Steps (a) to (d) will be explained in more detail below.

The inventive process starts off from an electrode active material according to general formula $Li_{1+x2}TM_{1-x2}O_2$, step (a), wherein providing a material according to general formula $Li_{1+x2}TM_{1-x2}O_2$ wherein TM is a combination of Ni and at least one of Mn, Co and Al, and, optionally, at least one more metal selected from Mg, Ti, Zr, Nb, Ta, and W, and x2 is in the range of from zero to 0.25. Electrode active material according to general formula $Li_{1+x2}TM_{1-x2}O_2$ may hereinafter also be referred to as "starting material".

In one embodiment of the present invention electrode active material according to general formula $Li_{1+x2}TM_{1-x2}O_2$ has an average particle diameter (D50) in the range of from 3 to 20 μm, preferably from 5 to 16 μm. The average particle diameter may be determined, e. g., by light scattering or LASER diffraction or electroacoustic spectroscopy. The particles are usually composed of agglomerates from primary particles, and the above particle diameter refers to the secondary particle diameter.

In one embodiment of the present invention, electrode active material according to general formula $Li_{1+x2}TM_{1-x2}O_2$ has a monomodal particle diameter distribution. In another embodiment of the present invention, electrode active material according to general formula $Li_{1+x2}TM_{1-x2}O_2$ has a bimodal particle diameter distribution.

In one embodiment of the present invention, the starting material has a specific surface (BET), hereinafter also referred to as "BET surface", in the range of from 0.1 to 1.0 $m^2/g$. The BET surface may be determined by nitrogen adsorption after outgassing of the sample at 200° C. for 30 minutes or more and beyond this accordance with DIN ISO 9277:2010.

In one embodiment of the present invention, the starting material has a moisture content in the range of from 20 to 2,000 ppm, determined by Karl-Fischer titration, preferred are 200 to 1,200 ppm.

Core (A) is preferably a nickel-rich electrode active material. Although the percentage of nickel in the core may be 50 mole-% or even lower, e.g., 40 mole-%, it is preferred that the molar percentage of nickel in the core material is at least 60 mole-%, referring to all metals in TM.

TM in the above formula contains at least one of Mn, Co and Al, preferably at least two, e.g., Co and Mn, Co and Al, or even Mn, Co, and Al.

Optionally, TM may contain at least one more metal selected from Mg, Ti, Nb, Ta, and W.

In one embodiment of the present invention, TM is a combination of metals according to general formula (I)

$$(Ni_aCo_bMn_c)_{1-d}M_d \quad \text{(I)}$$

with a being in the range of from 0.6 to 0.95, preferably from 0.75 to 0.95, more preferably from 0.80 to 0.91, b being in the range of from 0.025 to 0.2, preferably from 0.025 to 0.1, c being in the range of from 0.025 to 0.2, preferably from 0.025 to 0.1, and more preferably from 0.04 to 0.1, d being in the range of from zero to 0.1, M is selected from Al, Mg, Ti, Zr, Nb, Ta and W, and combinations of at least two of the foregoing, preferably Al and Al and at least one of the foregoing, and a+b+c=1.

In another embodiment of the present invention, the variable TM corresponds to general formula (I a)

$$(Ni_{a^*}Co_{b^*}Al_e)_{1-d^*}M^2_d \quad \text{(I a)}$$

with a*+b*+e*=1 and a* being in the range of from 0.75 to 0.95, preferably from 0.88 to 0.95, b* being in the range of from 0.025 to 0.2, preferably from 0.025 to 0.1, e* being in the range of from 0.01 to 0.2, preferably from 0.015 to 0.04, d* being in the range of from zero to 0.1, preferably from zero to 0.02, $M^2$ is at least one of W, Mo, Ti or Zr.

The starting material provided in step (a) is usually free from conductive carbon, that means that the conductive carbon content of starting material is less than 1% by weight, referring to said starting material, preferably 0.001 to 1.0% by weight.

Again, some elements are ubiquitous. In the context of the present invention, traces of ubiquitous metals such as sodium, calcium, iron or zinc, as impurities will not be taken into account. Traces in this context will mean amounts of 0.05 mol-% or less, referring to the total metal content of the starting material.

In step (b), said material is contacted with an oxide or (oxy)hydroxide or nitrate of cobalt and, up to 10% by vol of water and, optionally, at least one oxide or hydroxide or oxyhydroxide of Ti, Zr or Al. Such contacting is achieved by adding said an oxide or hydroxide of cobalt and, optionally, up to 10% by vol of water and, optionally, at least one oxide or hydroxide or oxyhydroxide of Ti, Zr or Al to the starting material, followed by mixing.

In step (b), preferably no compound of lithium is added.

Examples of oxides and (oxy)hydroxides of cobalt are CoO, $Co_3O_4$, $Co(OH)_2$, CoOOH, nonstoichiometric oxyhydroxides of cobalt. Preferred is $Co_3O_4$. An example of cobalt nitrate is $Co(NO_3)_2$. Water of crystallinity is omitted for legibility purposes.

Examples of optionally added oxide or (oxy)hydroxide or nitrates of Ti, Zr or Al are $TiO_2$, $Ti_2O_3$, $TiO(OH)_2$, $TiO_2$.aq, $Al_2O_3$, AlOOH, $Al(OH)_3$, $Al_2O_3$.aq, $ZrO_2$, $Zr(OH)_4$, and $ZrO_2$.aq, and $AlONO_3$, $Al(NO_3)_3$, $TiO(NO_3)_2$, $Ti(NO_3)_4$, $ZrO(NO_3)_2$ and $Zr(NO_3)_4$.

In one embodiment of the present invention, step (b) is performed by adding an aqueous slurry of an oxide or (oxy)hydroxide of cobalt or an aqueous solution of a nitrate of cobalt and, optionally, of at least one oxide or hydroxide or oxyhydroxide of Ti, Zr or Al to the starting material, followed by mixing.

In one embodiment of the present invention, step (b) is performed by adding an aqueous slurry of an oxide or (oxy)hydroxide of cobalt or an aqueous solution of a nitrate of cobalt and one oxide or hydroxide or oxyhydroxide of Ti, Zr and/or Al to the starting material, followed by mixing, wherein the molar amount of Co is higher than the molar amount of Ti, Zr or Al, respectively. Even more preferably, wherein the molar amount of Co is higher than the molar amount of Ti, Zr and Al.

In one embodiment of the present invention, step (b) is performed in a mixer, for example a paddle mixer, a ploughshare mixer, a free-fall mixer, a roller mill, or a high-shear mixer. Free fall mixers are using the gravitational force to achieve mixing. Plough-share mixers are preferred.

In one embodiment of the present invention the mixer operates in step (b) with a speed in the range of from 5 to 500 revolutions per minute ("rpm"), preferred are 5 to 60 rpm. In embodiments wherein a free-fall mixer is applied, from 5 to 25 rpm are more preferred and 5 to 10 rpm are even more preferred. In embodiments wherein a plough-share mixer is applied, 50 to 400 rpm are preferred and 100 to 250 rpm are even more preferred. In the case of high-shear mixers, 100 to 950 rpm of the agitator and 100 to 3,750 rpm of the chopper are preferred.

In one embodiment of the present invention, the weight ratio of core (A) and particles (B) is in the range of from 1000:1 to 10 to 1, preferably 100:1 to 20:1.

In one embodiment of the present invention, step (b) is performed in the presence of minor amounts of a solvent, for example, water. Minor amount refers to up to 10% by volume, referring to the entire solids content of the mixture, preferred are 0.1 to 5% by volume.

In one embodiment of the present invention, the duration of step (b) is in the range of from one minute to 2 hours, preferred are ten minutes to one hour.

In one embodiment of the present invention, step (b) is preferred at a temperature in the range of from 10 to 80° C. Even more preferred is ambient temperature.

In one embodiment of the present invention, step (b) is performed in an air atmosphere, or under an inert gas such as nitrogen. Ambient air is preferred.

From step (b), a mixture is obtained. In embodiments in which water is used the mixture has the appearance of a moist powder.

In the optional step (c), water or solvent is removed at least partially from the mixture obtained from step (b), for example by evaporation. In a preferred embodiment of step (c), the water is evaporated at least partially at a temperature in the range of from 105 to 200° C. Preferably, water evaporation is performed at normal pressure.

In one embodiment of the present invention, step (d) is performed at a temperature in the range of from 450 to 850° C., preferably 500 to 750° C.

In one embodiment of the present invention, the temperature is ramped up before reaching the desired temperature of from 450 to 850° C., preferably 500 to 750° C. For example, first the mixture of step (b) or (c) is heated to a temperature to 350 to 550° C. and then held constant for a time of 10 min to 4 hours, and then it is raised to 500 to 850° C.

In one embodiment of the present invention, the heating rate in step (d) is in the range of from 0.1 to 10° C./min.

In one embodiment of the present invention, step (d) is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, step (d) is performed in an oxygen-containing atmosphere, for example in a nitrogen-air mixture, in a rare gas-oxygen mixture, in air, in oxygen or in oxygen-enriched air. In a preferred embodiment, the atmosphere in step (b) is selected from air, oxygen and oxygen-enriched air. Oxygen-enriched air may be, for example, a 50:50 by volume mix of air and oxygen. Other options are 1:2 by volume mixtures of air and oxygen, 1:3 by volume mixtures of air and oxygen, 2:1 by volume mixtures of air and oxygen, and 3:1 by volume mixtures of air and oxygen.

In one embodiment of the present invention, step (d) is carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform step (d) under an atmosphere with a carbon dioxide content below detection limit for example with infrared-light based optical methods.

In one embodiment of the present invention, step (d) has a duration in the range of from one hour to 30 hours. Preferred are 60 minutes to 4 hours. The cooling time is neglected in this context.

After thermal treatment in accordance to step (d), the electrode active material so obtained is cooled down before further processing.

By performing the inventive process electrode active materials with excellent properties are available through a straightforward process. Preferably, the electrode active materials so obtained have a surface (BET) in the range of from 0.1 to 0.8 $m^2/g$, determined according to DIN-ISO 9277:2003-05.

Without wishing to be bound by any theory, it is assumed that extractable lithium and especially residual lithium is at least partially drawn to the surface and reacted with Co to Co—Li-containing oxide species.

The present invention is further illustrated by the following working examples.

Percentages are % by weight unless specifically denoted otherwise RPM: rounds per minute I. Cathode Active Materials I.1. Preparation of a Precursor TM-OH.1 for Cathode Active Materials A stirred tank reactor was filled with deionized water and 49 g of ammonium sulfate per kg of water. The solution was tempered to 55° C. and a pH value of 12 was adjusted by adding an aqueous sodium hydroxide solution.

The co-precipitation reaction was started by simultaneously feeding an aqueous transition metal sulfate solution and aqueous sodium hydroxide solution at a flow rate ratio of 1.8, and a total flow rate resulting in a residence time of 8 hours. The transition metal solution contained Ni, Co and Mn at a molar ratio of 87:5:8 and a total transition metal concentration of 1.65 mol/kg. The aqueous sodium hydroxide solution was a 25 wt. % sodium hydroxide solution and 25 wt. % ammonia solution in a weight ratio of 6. The pH value was kept at 12 by the separate feed of an aqueous sodium hydroxide solution. Beginning with the start-up of all feeds, mother liquor was removed continuously. After 33 hours all feed flows were stopped. The mixed transition metal (TM) oxyhydroxide precursor TM-OH.1 was obtained by filtration of the resulting suspension, washing with distilled water, drying at 120° C. in air and sieving.

I.2. Manufacture of Cathode Active Materials (Pristine), Step (a)

CAM.P (pristine): The mixed transition metal oxyhydroxide precursor obtained according to 1.1 was mixed with 0.15 mole-% $TiO_2$ (average primary particle diameter 14 nm), 0.15 mole-% of amorphous $Zr(OH)_4$, both mole-% referring to the sum of Ni, Co and Mn in TM-OH.1 and LiOH monohydrate in a Li/(TM) molar ratio of 1.05. The mixture was heated to 760° C. and kept for 8 hours in a forced flow of oxygen to obtain the electrode active material CAM.P.

D50=11.2 μm determined using the technique of laser diffraction in a Mastersizer 3000 instrument from Malvern Instruments. Residual moisture at 230° C. was determined to be 214 ppm.

I.3: Post-Treatment Processes

I.3.1: Wet Coating, Followed by a Heat Treatment, Steps (b.1), (c.1) and (d.1)

A Lödige plough share mixer was charged with 3,000 g CAM.P, 315 g of $Co(NO_3)_2.6H_2O$, 17.4 g of $Al(NO_3)_3$ and 3.7 g of $TiO_2$. 180 g of water were added. The plough share mixer was set to 150 RPM for 25 minutes. Then, a mixed powder was obtained.

The mixed powder was heat treated at a treatment temperature of 700° C. for two hours in oxygen. The heating rate was 3° C./min. Then, the resultant CAM.1 was allowed to cool down to ambient temperature.

SEM/EDX analysis revealed that sub-micron sized coating material particles (B.1) of $Al_2O_3$, $TiO_2$ and were distributed along the surface of CAM.1.

II. Testing of Cathode Active Material

II.1 Electrode Manufacture, General Procedure

II.1.1 Cathode Manufacture

Positive electrode: PVDF binder (Solef® 5130) was dissolved in NMP (Merck) to produce a 7.5 wt. % solution. For electrode preparation, binder solution (3 wt. %), graphite (SFG6L, 2 wt. %), and carbon black (Super C65, 1 wt.-%) were suspended in NMP. After mixing using a planetary centrifugal mixer (ARE-250, Thinky Corp.; Japan), inventive CAM.1 or a comparative cathode active material CAM.P (94 wt. %) was added and the suspension was mixed again to obtain a lump-free slurry. The solid content of the slurry was adjusted to 65%. The slurry was coated onto Al foil using a roll-to-roll coater. Prior to use, all electrodes were calendared. The thickness of cathode material was 70 μm, corresponding to 15 $mg/cm^2$. All electrodes were dried at 105° C. for 7 hours before battery assembly.

II.1.2: Pouch Cell Anode Manufacture

Graphite and carbon black were thoroughly mixed. CMC (carboxymethyl cellulose) aqueous solution and SBR (styrene butadiene rubber) aqueous solution were used as binder. The mixture of graphite and carbon black, weight ration cathode active material:carbon:CMC:SBR like 96:0.5:2:1.5, was mixed with the binder solutions and an adequate amount of water was added to prepare a suitable slurry for electrode preparation. The thus obtained slurry was coated by using a roll coater onto copper foil (thickness=10 μm) and dried under ambient temperature. The sample loading for electrodes on Cu foil was fixed to be 10 mg $cm^{-2}$ for single layer pouch cell testing.

II.2: Electrolyte Manufacture

A base electrolyte composition was prepared containing 12.7 wt % of $LiPF_6$, 26.2 wt % of ethylene carbonate (EC), and 61.1 wt % of ethyl methyl carbonate (EMC) (EL base 1), based on the total weight of EL base 1. To this base electrolyte formulation, 2 wt. % of vinylene carbonate (VC) was added (EL base 2).

II.3 Test Cell Manufacture

II.3.1 Coin-Type Half Cells Coin-type half cells (20 mm in diameter and 3.2 mm in thickness) comprising a cathode prepared as described under III.1.1 and lithium metal as working and counter electrode, respectively, were assembled and sealed in an Ar-filled glove box. In addition, the cathode and anode and a separator were superposed in order of cathode//separator//Li foil to produce a half coin cell. Thereafter, 0.15 mL of the EL base 1 which is described above (III.2) were introduced into the coin cell.

II.3.2 Pouch Cells

Single layer pouch cells (70 mA-h) comprising an anode prepared as described above in III.1.1 and a graphite electrode according to III.1.2, were assembled and sealed in an Ar-filled glove box. The cathode and the anode and a separator were superposed in order of cathode//separator//anode to produce a several layer-pouch cell. Thereafter, 0.8 mL of the EL base 2 electrolyte were introduced into the Laminate pouch cell.

III. Evaluation of Cell Performance

Evaluation of Coin Half-Cell Performance

Cell performance were evaluated using the produced coin type battery. For the battery performances, initial capacity and reaction resistance of cell were measured.

The initial performance and cycle were measured as follows: Coin half cells according to 11.3.1 were tested in a voltage range between 4.3 V to 2.8 V at room temperature. For the initial cycles, the initial lithiation was conducted in the CC-CV mode, i.e., a constant current (CC) of 0.1 C was applied until reaching 0.01 C. After 10 min resting time, reductive lithiation was carried out at constant current of 0.1 C up to 2.8 V. For the cycling, the current density is 1 C. The results are summarized in Table 1.

TABLE 1

| 1st cycle performance and electrochemistry | | | | | | |
|---|---|---|---|---|---|---|
| Material | Charge Cap. [mAh/g] | Discharge Cap. [mAh/g] | C. E. [%] | Initial ASR [$\Omega \cdot cm^2$] | ASR after 100 Cycles [$\Omega \cdot cm^2$] | Capacity Retention [%] |
| CAM.P | 229 | 198 | 87 | 40 | 75 | 87 |
| CAM.1 | 228 | 201 | 88 | 28 | 54 | 89 |

ASR: Area specific resistance

Gassing:

Single-layer pouch cells according to 11.3.2 were charged to 100% state of charge, stored at 80° C. for 24 hours and then measured for gassing.

| Tale 2: Gassing | | |
|---|---|---|
| Material | CAM.P | CAM.1 |
| Gas generation [mL] | 0.38 | 0.17 |

The invention claimed is:

1. An electrode active material comprising:

(A) a core material according to general formula $Li_{1+x1}TM_{1-x1}O_2$, wherein TM is a combination of Ni and at least one of Mn, Co and Al, and, optionally, at least one more metal selected from Mg, Ti, Zr, Nb, Ta, and W, and x1 is in a range from −0.05 to 0.2, and (B) particles of cobalt compound(s) and of aluminum compound(s) and of titanium compound(s) or zirconium compound(s), wherein the molar ratio of lithium to cobalt in the particles ranges from zero to below 1 and wherein in particles (B) a molar ratio of Co to a sum of Al and Zr or Ti ranges from 2:1 to 50:1, and wherein the particles are attached to the surface of the core material;

wherein the weight ratio of core (A) and particles (B) ranges from 1000:1 to 20:1.

2. The electrode active material according to claim 1, wherein TM is a combination of metals according to general formula (I)

$$(Ni_aCo_bMn_c)_{1-d}M_d \quad (I)$$

with a ranges from 0.6 to 0.95, b ranges from 0.025 to 0.2, c ranges from 0.025 to 0.2, and d ranges from zero to 0.1, M is selected from Al, Mg, Ti, Zr, Nb, Ta, W, and combinations of at least two of the foregoing and a+b+c=1.

3. The electrode active material according to claim 1, wherein the particles comprise $Co_3O_4$.

4. The electrode active material according to claim 1, wherein the weight ratio of core (A) and particles (B) ranges from 1 100:1 to 20:1.

5. The electrode active material according to claim 1, wherein the particles (B) have an average diameter (D50) ranging from 10 nm to 10 μm.

6. A process for making the electrode active material of claim 1 comprising:

(a) providing a material according to general formula $Li_{1+x2}TM_{1-x2}O_2$, wherein TM is a combination of Ni and at least one of Mn, Co and Al, and, optionally, at least one more metal selected from Mg, Ti, Zr, Nb, Ta, and W, and x2 ranges of from zero to 0.25, (b) contacting the material with an oxide or (oxy) hydroxide or nitrate of cobalt and up to 10% by vol of water and with at least one oxide or (oxy) hydroxide or nitrate of Ti, Zr or Al, (c) removing water from the mixture obtained in step (b), and (d) calcining the intermediate of step (c).

7. The process according to claim 6, wherein step (d) is performed at a temperature ranging from 500° C. to 850° C.

8. The process according to claim 6, wherein step (b) is performed in a mixer.

9. The process according to claim 6, wherein step (b) is performed by adding an aqueous slurry of an oxide or (oxy) hydroxide of cobalt and of at least one oxide or hydroxide or oxyhydroxide of each Ti, Zr and Al to the material provided in step (a), followed by mixing.

10. The process according to claim 6, wherein step (c) is performed by evaporating the water at least partially at a temperature ranging from 105° C. to 200° C.

11. An electrode containing (A) at least one electrode active material according to claim 1, (B) carbon in electrically conductive form and (C) a binder.

12. A secondary battery containing (1) at least one electrode according to claim 11, (2) at least one anode, and (3) an electrolyte.

* * * * *